US006706432B2

(12) United States Patent
Oehr et al.

(10) Patent No.: US 6,706,432 B2
(45) Date of Patent: Mar. 16, 2004

(54) METHODS AND PRODUCTS FOR IMPROVING PERFORMANCE OF BATTERIES/FUEL CELLS

(75) Inventors: Klaus Heinrich Oehr, Surrey (CA); Steven Splinter, North Vancouver (CA); Joey Chung-Yen Jung, Delta (CA); Elod Lajos Gyenge, Vancouver (CA); Colin W. Oloman, Vancouver (CA)

(73) Assignee: Magpower Systems, Inc. (CA)

( * ) Notice: Subject to any disclaimer, the term of this patent is extended or adjusted under 35 U.S.C. 154(b) by 142 days.

(21) Appl. No.: 09/919,599

(22) Filed: Aug. 1, 2001

(65) Prior Publication Data

US 2003/0054208 A1 Mar. 20, 2003

(51) Int. Cl.[7] ................................................ H01M 8/00
(52) U.S. Cl. ....................... 429/13; 429/209; 429/218.1; 429/231.6
(58) Field of Search ........................ 429/13, 209, 218.1, 429/231.6

(56) References Cited

U.S. PATENT DOCUMENTS

| 3,594,235 A | | 7/1971 | Moran et al. |
| 4,046,651 A | * | 9/1977 | Burnett, Jr. et al. ......... 205/417 |
| 4,702,974 A | * | 10/1987 | Gregory et al. ............... 429/50 |
| 4,908,281 A | | 3/1990 | O'Callaghan |
| 5,004,654 A | * | 4/1991 | Hunter et al. .................. 429/50 |
| 5,024,904 A | | 6/1991 | Curiel |

OTHER PUBLICATIONS

A. Antonyraj and C.O. Augustin "Anomalous Behaviour of Magnesium Anodes In Different Electrolytes At High Concentrations" pp. 127–138.

G. Sang, A. Atrens, D. St John, J. Nairn and Y. Li. "The Electro–Chemical Corrosion of Pure Magnesium In N Naci" pp. 855–873.

A.P. Nazaror, A.P. Lisovskii and Yu. N. Mikhailovskii Formation of $MgH_2$ On Electrochemical Dissolution of Magnesium In Aqueous Electrolysis pps. 606–610.

Clive D.S. Tuck "Modern Battery Technology" pp : 487–502.

M.A. Quraishi, J Rawat and M. Ajmal "Dithiobiurets: A Novel class of Acid Corrision Inhibitors for Mild Steel" pp. 745–751.

* cited by examiner

Primary Examiner—Carol Chaney
Assistant Examiner—Dah-Wei D. Yuan
(74) Attorney, Agent, or Firm—Hall, Priddy, Myers & Vande Sande

(57) ABSTRACT

A method of improving the performance of magnesium containing electrodes used in metal/air batteries (fuel cells), comprising the addition of one or more additives to the electrolyte or electrode surface. The additives are selected from any of the following groups; dithioburet, tin, and tin plus a quaternary ammonium salt.

20 Claims, No Drawings

METHODS AND PRODUCTS FOR IMPROVING PERFORMANCE OF BATTERIES/FUEL CELLS

FIELD

The present invention relates to methods and products for improving the performance of magnesium containing metal air battery/fuel cells in one or more ways including: increasing anode utilization efficiency (suppressing hydrogen evolution), increasing energy density, increasing power density or increasing cell voltage.

BACKGROUND

It is well known in the prior art that certain battery electrodes, especially those used in metal-air batteries/fuel cells, suffer from undesirable hydrogen evolution during their "discharge" in which they generate electrical power or when they are stored, due to corrosion and/or moderate energy density i.e. watt-hours/liter output and/or low cell voltage. These electrodes include those containing magnesium and aluminum and/or zinc alone or in combination, as examples. The production of hydrogen is described by commercial fuel cell (battery) suppliers (e.g. www.greenvolt.com/fuel cells.htm). This producer portrays this as a safety issue. However it also represents a waste of metal fuel.

It is well documented that magnesium suffers from parasitic hydrogen evolution in inorganic electrolytes. For example Antonyraj (Antonyraj, A. and C. O. Augustin, 1998, "Anomalous Behaviour of Magnesium Anodes in Different Electrolytes at High Concentrations", Corrosion Reviews, 16(1-2): 127–138) states "when magnesium metal comes in contact with aqueous electrolytes, self-dissolution of the metal and the evolution of hydrogen take place simultaneously" (see pg 131). Song et al. (Song, G. et al., 1997, "The Electrochemical Corrosion of Pure Magnesium in 1N NaCl", Corrosion Science, 39(5); 855–875) indicate that "under free corrosion conditions, magnesium corrosion can be considered to occur by the interaction of local anodes and cathodes" (see pg 871). Song et al. suggest that magnesium can be converted to hydride by the following electrochemical reaction (see pg 858);

$$Mg + 2H^+ + 2e^- = MgH_2 \quad (1)$$

$$MgH_2 + H_2O = Mg^{2+} + 2OH^- + 2H_2 \quad (2)$$

Proof of this suggested mechanism is given by Nazarov et al. (Nazarov, A. P. et al., 1989, "Formation of MgH$_2$ on Electrochemical Dissolution of Magnesium in Aqueous Electrolytes, Zashchita Metallov, 25(5): 760–765).

U.S. Pat. No. 5,024,904, issued to Curiel, describes the use of metal anodes, preferably made of magnesium, aluminum or magnesium-aluminum alloy, in combination with salt containing electrolytes and air cathodes for purposes of producing portable, direct current electrical power. Testing of the Curiel prototype by the current inventors has revealed the following major weakness: magnesium utilization efficiency as low as 30% due to parasitic hydrogen evolution.

U.S. Pat. No. 4,908,281, issued to O'Callaghan describes the undesirable production of hydrogen on aluminum electrodes in aluminum air cells (pg 1 lines 63+). "As with other batteries this hydrogen can easily reach explosive concentrations." (page 2 lines 10 to 12). One of the purposes of the O'Callaghan invention is to create a system designed to properly vent hydrogen to help prevent explosions. The electrolyte is designed to flow upwards and over a weir to discharge aluminum hydroxide product into an electrolyte reservoir. Air is used to dilute hydrogen below explosive limits. Tuck (Tuck, Clive D. S., Modern Battery Technology, 489–490) also describes parasitic, gaseous hydrogen evolution on aluminum contained in aqueous electrolytes.

Quraishi et al. (Quraishi, M. A. et al., 1999, "Dithiobiurets: A Novel Class of Acid Corrosion Inhibitors for Mild Steel, Journal of Applied Electrochemistry) have described the inhibition of corrosion/hydrogen evolution on steel, in strongly acidic environments using dithiobiurets with the following structure:

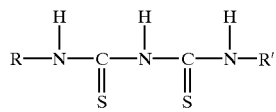

where R and R' are aryl substituted functional groups such as phenyl, tolyl and so on.

U.S. Pat. No. 5,004,654 issued to Hunter et al. describes the benefits of a source of tin e.g. tin containing ions such as stannate ions, on undesirable hydrogen evolution in aluminum/air cells.

U.S. Pat. No. 3,594,235 issued to Moran describes the use of quaternary ammonium salt containing electrolyte in combination with metal/air batteries (fuel cells) containing cadmium or magnesium electrodes. The use of quaternary ammonium salt as the sole electrolyte component other than water, especially at an excessively high concentration of 10% by weight, makes the Moran invention prohibitively expensive for non-military applications.

The prior art related to batteries, especially metal/air batteries (fuel cells) such as those including magnesium and aluminum and/or zinc, alone or in combination e.g. as alloys, has failed to incorporate knowledge in the use of hydrogen evolution inhibitors derived for steel, especially in highly acidic environments. Attempts to minimize deleterious evolution of hydrogen have been generally restricted to the use of exotic and/or expensive metal alloys.

Finally, the prior art related to magnesium/air batteries and fuel cells has failed to incorporate knowledge derived by the aluminum industry related to corrosion inhibition by tin containing electrolytes.

Accordingly, it is an object of the current invention to provide improved methods for inhibition of hydrogen evolution (improved anode utilization efficiency) and/or energy density and/or cell voltage and/or power density improvement in batteries, especially metal/air batteries (fuel cells), especially those containing magnesium, magnesium and aluminum, magnesium and zinc.

SUMMARY OF THE INVENTION

The invention relates to a method of improving the performance of magnesium containing electrodes used in metal/air batteries (fuel cells), comprising the addition of one or more additives to the electrolyte or electrode surface. More specifically it relates to performance improvement due to any one of the following factors alone or in combination: the inhibition of hydrogen evolution (improvement of electrode utilization), improvement of energy density, improvement of power density and/or increase in cell voltage. The additives are selected from any of the following groups; dithiobiuret, tin, and tin plus a quaternary ammonium salt.

Advantageously, dithiobiuret additives may be used, which have the following structure:

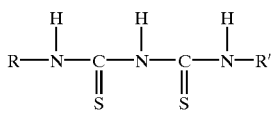

in which either or both of the R and or R' function groups contain an aryl group (aromatic ring structure), for example, in which R is a tolyl group —$C_6H_5$—$CH_3$ and R' is a phenyl group $C_6H_5$—.

Tin containing additives may be used either in the electrolyte or on the electrode surface, for example, in the form of stannate salts such as sodium stannate.

Tin containing additives may also be used either in the electrolyte or on the electrode surface, for example, in the form of stannate salts such as sodium stannate, in combination with a quaternary ammonium salt such as tricaprylmethylammonium chloride (e.g. Aliquate 336).

The invention also includes improved metal/air fuel cells and batteries based on the above methods.

DETAILED DESCRIPTION

The following non-limiting examples show the flexibility of the invention as applied to magnesium/air battery/fuel cells:

EXAMPLE 1

Magnesium AM60 alloy sheet anode (94% magnesium and 6% aluminum content by weight) was submerged together with an air cathode in a seawater electrolyte with and without the addition of 0.0001 molar dithiobiuret containing p-tolyl and phenyl R and R' functional groups, respectively. The cell was operated at a discharge current of 5 amperes (32 mamp/cm² starting anode current density) without replenishment of the electrolyte until the cell voltage dropped to zero due to dissolution of magnesium plus aluminum. The electrolyte was initially at room temperature. The average cell voltage, power density (watts per liter, W/L) energy density (watt hours per liter, Wh/L) and average anode utilization efficiency (100%—hydrogen production efficiency) for a single-cell system are summarized below:

|  | No Additive | With Dithiobiuret | % Improvement via Dithiobiuret |
|---|---|---|---|
| Cell Voltage (V) | 0.66 | 0.74 | 12 |
| Power Density (W/L) | 2.6 | 2.9 | 12 |
| Energy Density (W h/L) | 57.7 | 69.7 | 21 |
| Anode Utilization Efficiency (%) | 54 | 60 | 11 |

EXAMPLE 2

Magnesium AM60 alloy sheet anode was submerged together with an air cathode in a 13% by weight sodium chloride electrolyte with and without the addition of 0.0001 molar dithiobiuret containing p-tolyl and phenyl R and R' functional groups respectively. The cell was operated at a discharge current of 5 amperes (32 mamp/cm² starting anode current density) without replenishment of the electrolyte until the cell voltage dropped to zero due to dissolution of magnesium plus aluminum. The electrolyte was initially at room temperature. The average cell voltage, power density (watts per liter, W/L) energy density (watt hours per liter, Wh/L) and average anode utilization efficiency (100%—hydrogen production efficiency) for a single-cell system are summarized below:

|  | No Additive | With Dithiobiuret | % Improvement via Dithiobiuret |
|---|---|---|---|
| Cell Voltage (V) | 0.93 | 1.06 | 14 |
| Power Density (W/L) | 3.7 | 4.2 | 14 |
| Energy Density (W h/L) | 84.0 | 101.6 | 21 |
| Anode Utilization Efficiency (%) | 54 | 57 | 6 |

EXAMPLE 3

Magnesium AM60 alloy sheet anode was submerged together with an air cathode in a 24% sodium citrate, 12% sodium sulphate, 1% sodium chloride (all % by weight) electrolyte with and without the addition of 0.003 molar sodium stannate ($Na_2SnO_3$). The cell was operated at a discharge current of 5 amperes (32 mamp/cm² starting anode current density) without replenishment of the electrolyte until the cell voltage dropped to zero due to dissolution of magnesium plus aluminum. The electrolyte was initially at room temperature. The average cell voltage, power density (watts per liter, W/L) energy density (watt hours per liter, Wh/L) and average anode utilization efficiency (100%—hydrogen production efficiency) for a single-cell system are summarized below:

|  | No Additive | With Stannate | % Improvement via Stannate |
|---|---|---|---|
| Cell Voltage (V) | 0.49 | 0.76 | 55 |
| Power Density (W/L) | 2 | 3.1 | 55 |
| Energy Density (W h/L) | 32.9 | 56.4 | 71 |
| Anode Utilization Efficiency (%) | 75 | 73 | −3 |

EXAMPLE 4

The experiment in Example 3 above was repeated with the further addition of a quaternary ammonium salt, tricaprylmethylammonium chloride ($[CH_3(CH_2)_7]_3CH_3N^+Cl^-$, Aliquat® 336) to the electrolyte at 0.0001 molar concentration. The average cell voltage, power density (watts per liter), energy density (watt hours per liter, Wh/L) and average anode utilization efficiency (100%—hydrogen production efficiency) are summarized below:

|  | No additive | With Aliquat 336 + Stannate | % Improvement via Combination Additive |
|---|---|---|---|
| Cell Voltage (V) | 0.49 | 0.71 | 45 |
| Power Density (W / L) | 2.0 | 2.9 | 45 |
| Energy Density (W h / L) | 32.9 | 55 | 67 |
| Anode Utilization Efficiency (%) | 75 | 82 | 9 |

This experiment clearly shows the beneficial interaction between tin and quaternary ammonium salt additives in improvement of the metal/air battery performance with anodes containing magnesium or its alloys.

EXAMPLE 5

The experiment in Example 4 above was repeated with the removal of the tin additive (i.e. stannate) from the electrolyte, while retaining the quaternary ammonium salt additive Aliquat 336. The average cell voltage, power density (watts per liter, W/L), energy density (watt hours per liter Wh/L) and average anode utilization efficiency (100%—hydrogen production efficiency) are summarized below:

|  | No Additive | With Aliquat 336 | % Improvement via Aliquat 336 |
|---|---|---|---|
| Cell Voltage (V) | 0.49 | 0.71 | 45 |
| Power Density (W / L) | 2.0 | 2.9 | 45 |
| Energy Density (W h / L) | 32.9 | 49.3 | 50 |
| Anode Utilization Efficiency (%) | 75 | 79 | 5 |

Although the addition of the quaternary ammonium salt additive improved the cell performance, the combination of tin containing additives with the quaternary ammonium salt and magnesium containing anodes, was clearly superior to that of a quaternary ammonium salt alone, as shown by the energy density and anode utilization efficiency comparison with Example 4. The combination of a tin additive and a quaternary ammonium salt suppressed hydrogen evolution on a magnesium containing anode to a greater extent than either additive used alone.

EXAMPLE 6

In order to investigate the effect of the additives in conjunction with zinc-containing magnesium alloys experiments were performed using AZ31 alloy sheet anode submerged with an air cathode in an electrolyte mixture composed of 24% by weight sodium citrate, 12% by weight sodium sulfate and 1% by weight sodium chloride. Experiments were performed with and without additives present in the electrolyte. The additives were either 0.0001 molar Aliquat 336 or a combination of 0.0001 molar Aliquat 336 and 0.003 molar sodium stannate. A discharge current per cell of 5 A was applied (anode current density at start of 35 mamp/cm$^2$) and the experiment was continued until the cell voltage dropped to 0.8 V. The electrolyte was initially at room temperature and it was used without replenishment. The average cell voltage, power density (watt per liter, W/L), energy density (watt hours per liter, W/L) and anode utilization efficiency (100%—hydrogen production efficiency) per single cell are summarized below:

|  | No Additive | With Aliquat 336 and Stannate | % Improvement via Combination Additive |
|---|---|---|---|
| Cell Voltage (V) | 0.87 | 0.91 | 5 |
| Power Density (W / L) | 3.5 | 3.7 | 6 |
| Energy Density (W h / L) | 10.7 | 11.5 | 7 |
| Anode Utilization Efficiency (%) | 84 | 95 | 13 |

|  | No Additive | With Aliquat 336 | % Improvement via Aliquat 336 Additive |
|---|---|---|---|
| Cell Voltage (V) | 0.87 | 0.70 | −19 |
| Power Density (W / L) | 3.5 | 2.8 | −20 |
| Energy Density (W h / L) | 10.7 | 15.4 | 44 |
| Anode Utilization Efficiency (%) | 84 | 65 | −23 |

The above example shows that using the combination additive (i.e. quaternary ammonium salt Aliquat 336 and stannate) in conjunction with the AZ31 alloy, improved all 4 performance factors of the magnesium-air fuel cell containing a magnesium-aluminum-zinc alloy.

Accordingly, while this invention has been described with reference to illustrative embodiments, this description is not intended to be construed in a limiting sense. Various modifications of the illustrative embodiments, as well as other embodiments of the invention, will be apparent to persons skilled in the art upon reference to this description. It is therefore contemplated that the appended claims will cover any such modifications or embodiments as fall within the scope of the invention.

We claim:

1. A method of improving performance of magnesium electrodes used in metal/air batteries or fuel cells comprising:

(a) adding one or more additives to the electrolyte or an electrode surface, said additives selected from the group consisting of: dithiobiuret, and tin plus a quaternary ammonium salt.

2. The method according to claim 1, wherein said tin is added to said electrolyte as a stannate salt.

3. The method according to claim 1, wherein said tin is added to said electrode surface as tin metal, for example as a magnesium/tin alloy.

4. The method according to claim 2, wherein said stannate salt is sodium stannate.

5. The method according to claim 1, wherein said dithiobiuret has the structure:

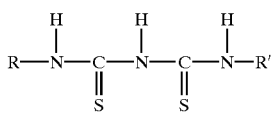

6. The method according to claim 5, wherein one or both of the R and R" function groups contain an R' group with an aromatic ring structure.

7. The method according to claim 6, wherein said R group is a tolyl group (—C$_6$H$_5$—CH$_3$) and said R' group is a phenyl group (—C$_6$H$_5$—).

8. An improved metal/air fuel cell or battery, comprising:
   (a) a magnesium-containing electrode;
   (b) an air electrode;
   (c) an electrolyte; and
   (d) one or more additives, said one or more additives being added to said magnesium-containing electrode or said electrolyte, said one or more additives being selected from the group consisting of: dithiobiuret, and tin plum a quaternary ammonium salt, wherein said one or more additives results in a performance improvement of said metal/air batteries or fuel cells.

9. The improved fuel cell/battery according to claim 8, wherein said tin is added to said electrolyte as a stannate salt.

10. The improved fuel cell/battery according to claim 8, wherein said tin is added to said electrode surface as tin metals for example as a magnesium/tin alloy.

11. The improved fuel cell/battery according to claim 9, wherein said stannate salt is sodium stannate.

12. The improved fuel cell/battery according to claim 8, wherein said dithiobiuret has the structure:

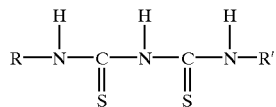

13. The improved fuel cell/battery according to claim 12, wherein one or both of the R and R" function groups contain an aryl group with an aromatic ring structure.

14. The improved fuel cell/battery according to claim 13, wherein said R group is a tolyl group (—C$_6$H$_5$—CH$_3$) and said R' group is a phenyl group (—C$_6$H$_5$—).

15. An improved fuel cell/battery comprising:
   (a) a magnesium-containing electrode;
   (b) an air electrode;
   (c) an electrolyte; and
   (d) a dithiobiuret additive contacting a surface of said magnesium-containing electrode, wherein said dithiobiuret additive inhibits hydrogen formation at said magnesium-containing electrode.

16. The improved fuel cell/battery according to claim 15, wherein said contact is achieved by the adding said dithiobiuret additive to a liquid which is in contact with said metal.

17. The improved fuel cell/battery according to claim 15, wherein said metal is dipped in a dithiobiuret containing liquid and then allowed to dry.

18. The improved fuel cell/battery according to claim 17, wherein said liquid can evaporate.

19. The improved fuel cell/battery according to claim 8, wherein said quaternary ammonium salt is tricaprylmethyammonium chloride.

20. The improved fuel cell/battery according to claim 8, wherein said magnesium containing electrode also contains aluminum and/or tin and/or zinc.

* * * * *

UNITED STATES PATENT AND TRADEMARK OFFICE
CERTIFICATE OF CORRECTION

PATENT NO.    : 6,706,432 B2
DATED         : March 16, 2004
INVENTOR(S)   : Oehr et al.

It is certified that error appears in the above-identified patent and that said Letters Patent is hereby corrected as shown below:

<u>Title page, Item [54] and Column 1, line 1,</u>
Delete "METHODS" and insert -- METHOD --.

<u>Column 7,</u>
Line 1, insert "tin" after "dithiobiuret".
Line 32, delete "plum" and insert -- plus --.

Signed and Sealed this

Twelfth Day of October, 2004

JON W. DUDAS
*Director of the United States Patent and Trademark Office*